United States Patent
Zhao et al.

(10) Patent No.: US 9,301,323 B2
(45) Date of Patent: Mar. 29, 2016

(54) CONTENTION-FREE RANDOM ACCESS PROCEDURE IN WIRELESS NETWORKS

(75) Inventors: Wei Zhao, Solna (SE); Tobias Tynderfeldt, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 66 days.

(21) Appl. No.: 14/344,350

(22) PCT Filed: Sep. 16, 2011

(86) PCT No.: PCT/SE2011/051117
§ 371 (c)(1),
(2), (4) Date: Mar. 12, 2014

(87) PCT Pub. No.: WO2013/039435
PCT Pub. Date: Mar. 21, 2013

(65) Prior Publication Data
US 2014/0362794 A1    Dec. 11, 2014

(51) Int. Cl.
*H04W 74/08* (2009.01)
*H04W 56/00* (2009.01)
(Continued)

(52) U.S. Cl.
CPC ...... *H04W 74/0833* (2013.01); *H04W 56/0045* (2013.01); *H04W 74/04* (2013.01); *H04W 74/0858* (2013.01); *H04W 36/08* (2013.01)

(58) Field of Classification Search
CPC .................................................. H04W 74/0083
USPC .......... 370/329, 350, 252, 336, 366; 455/450, 455/452.1
See application file for complete search history.

(56) References Cited

U.S. PATENT DOCUMENTS 7,242,972 B2 *   7/2007   Harris ........................... 455/574
7,792,205 B2 *   9/2010   Zhang et al. .................. 375/262

(Continued)

FOREIGN PATENT DOCUMENTS

WO    WO2010077122 A2    7/2010
WO    WO 2010/143846    12/2010

OTHER PUBLICATIONS

3GPP TSG RAN WG2 #60bis, ZTE "Message 3 aspect for DL data arrival case", published in 2008.*

(Continued)

*Primary Examiner* — Parth Patel
(74) *Attorney, Agent, or Firm* — Baker Botts, LLP

(57) ABSTRACT

In order to provide a more robust contention-free random access procedure for use in a cellular wireless network and specifically, a contention-free random access procedure that is able to recover more quickly in case of failure a method for a radio access node (10) that is arranged in a wireless network and communications with user equipment, UE (20) and a radio access node are proposed. The method includes: receiving a first random access message (40) from a UE, the first message containing a pre-assigned contention-free random access preamble and representing a start of a random access procedure; responding to the received first message by sending a second message (50) to the UE, the second message containing time alignment information to enable a scheduled transmission of a third message (60) by the UE; ascertaining that no third message is received from the UE within a predetermined period of time and transmitting a command (80) to the UE ordering a restart of the random access procedure with the same pre-assigned contention-free random access preamble.

13 Claims, 4 Drawing Sheets

(51) Int. Cl.
*H04W 74/04* (2009.01)
*H04W 36/08* (2009.01)

(56) References Cited

U.S. PATENT DOCUMENTS

| | | | | |
|---|---|---|---|---|
| 8,194,694 | B2* | 6/2012 | Kato et al. | 370/442 |
| 8,861,449 | B2* | 10/2014 | Wager et al. | 370/329 |
| 2007/0177630 | A1* | 8/2007 | Ranta et al. | 370/473 |
| 2007/0274342 | A1* | 11/2007 | Kim et al. | 370/473 |
| 2008/0232317 | A1* | 9/2008 | Jen | 370/329 |
| 2009/0300457 | A1* | 12/2009 | Kuo | 714/749 |
| 2009/0316593 | A1* | 12/2009 | Wang et al. | 370/252 |
| 2010/0035581 | A1* | 2/2010 | Park et al. | 455/412.1 |
| 2010/0105405 | A1* | 4/2010 | Vujcic | 455/452.1 |
| 2010/0124188 | A1* | 5/2010 | Wu | 370/328 |
| 2010/0177747 | A1* | 7/2010 | Chun et al. | 370/336 |
| 2010/0195636 | A1* | 8/2010 | Nakashima et al. | 370/342 |
| 2010/0195640 | A1* | 8/2010 | Park et al. | 370/350 |
| 2010/0254333 | A1* | 10/2010 | Shin et al. | 370/329 |
| 2011/0013542 | A1* | 1/2011 | Yu et al. | 370/280 |
| 2011/0038361 | A1* | 2/2011 | Park et al. | 370/350 |
| 2011/0116364 | A1* | 5/2011 | Zhang et al. | 370/216 |
| 2011/0170535 | A1* | 7/2011 | Wang et al. | 370/350 |
| 2011/0194432 | A1* | 8/2011 | Kato et al. | 370/252 |
| 2011/0207466 | A1* | 8/2011 | Hegge | 455/450 |
| 2011/0237265 | A1* | 9/2011 | Sugawara et al. | 455/450 |
| 2011/0249635 | A1* | 10/2011 | Chen et al. | 370/329 |
| 2012/0076126 | A1* | 3/2012 | Yi et al. | 370/338 |
| 2012/0082107 | A1* | 4/2012 | Ou et al. | 370/329 |
| 2012/0134288 | A1* | 5/2012 | Fang et al. | 370/252 |
| 2012/0163179 | A1* | 6/2012 | Jo et al. | 370/237 |
| 2012/0184306 | A1* | 7/2012 | Zou et al. | 455/458 |
| 2012/0281679 | A1* | 11/2012 | Fan et al. | 370/336 |
| 2013/0003700 | A1* | 1/2013 | Zhang et al. | 370/331 |
| 2013/0021902 | A1* | 1/2013 | Du et al. | 370/228 |
| 2013/0107862 | A1* | 5/2013 | Yang et al. | 370/331 |
| 2013/0329654 | A1* | 12/2013 | Zakrzewski | 370/329 |
| 2014/0213277 | A1* | 7/2014 | Jang | 455/453 |

OTHER PUBLICATIONS

Extended European Search Report issued by the EPO for Application No. Patent. No. 11872520.9-1855 / 2756729 PCT/SE2011051117, May 25, 2015.

3GPP TSG RAN WG2 #60bis; Sevilla, Spain; Title: Message 3 aspect for DL data arrival case; R2-080028, Jan. 14-18, 2008.

International Search Report for International Application No. PCT/SE2011/051117, Jun. 19, 2012.

3GPP TSG RAN WG2 #60bis; Source: ZTE; Title: Message 3 aspect for DL, data arrival case R2-080028, Jan. 2008.

3GPP TSG RAN WG2 Meeting #61; Source: ZTE; Title: Handover Failure and RRC re-establishment: R2-080741, Feb. 2008.

3GPP TSG RAN WG1 Meeting #49; Source: Samsung; Title; Using Restricted Preamble Set for RACH in High Mobility Environments: R1-072234, May 2007.

3GPP TS 36.300 V10.4.0, 3rd Generation Partnership Project; Technical, Specification Group Radio Access Network; Evolved Universal Terrestrial Radio Access (E-UTRA) and Evolved Universal Terrestrial Radio Access Network (U-TRAN); Overall description; Stage 2 (Release 10), Jun. 2011.

* cited by examiner

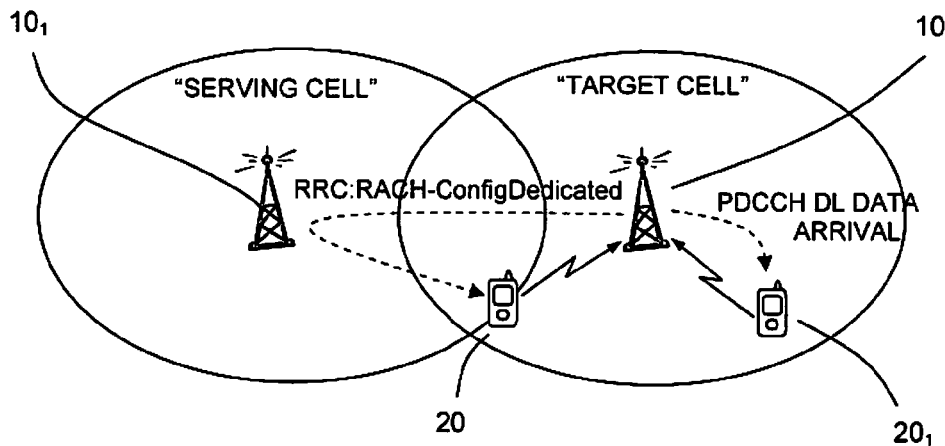
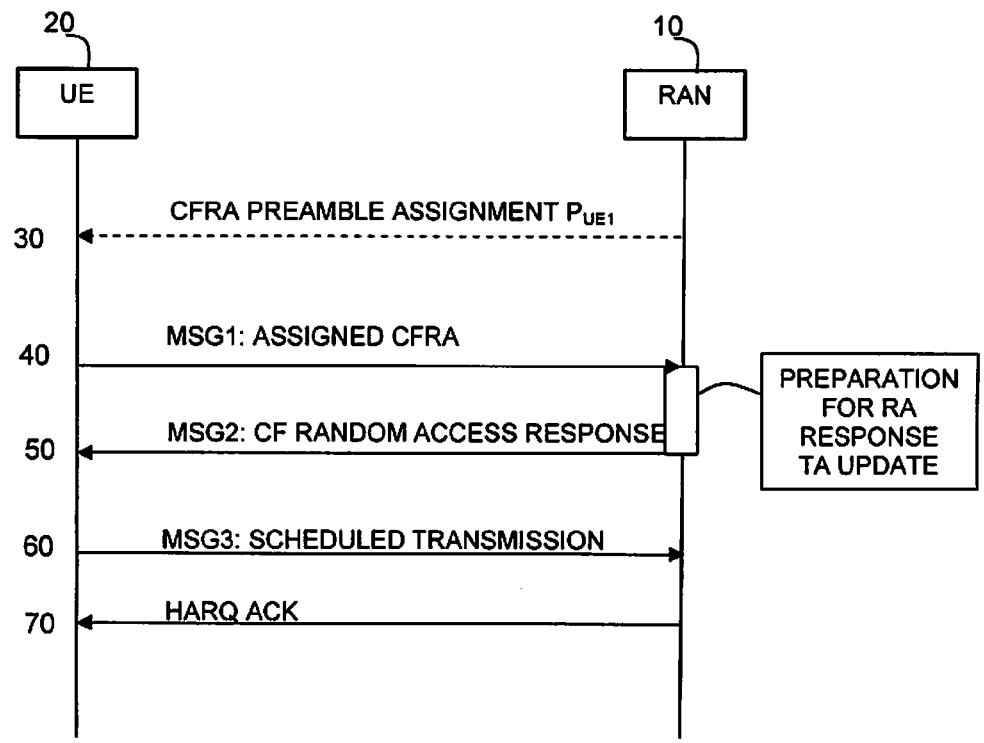
Fig. 1
Fig. 2

CONTENTION-FREE RANDOM ACCESS PROCEDURE IN WIRELESS NETWORKS

PRIORITY

This nonprovisional application is a U.S. National Stage Filing under 35 U.S.C. §371 of International Patent Application Serial No. PCT/SE2011/051117, filed Sep. 16, 2011 and entitled "Improved Contention-Free Random Access Procedure in Wireless Networks."

TECHNICAL FIELD

The disclosure generally relates to random access procedures in wireless telecommunication networks and has particular relevance to random access procedures between a user equipment and radio access node in Long Term Evolution (LTE) cellular networks.

BACKGROUND

Wireless communication networks include a number of Radio Access Nodes or RANs that provide access to a communication core network and a number of mobile stations or terminals. RANs are also commonly called base stations. In the 3GPP standardization of Long Term Evolution (LTE) wireless networks, also known as Evolved Universal Terrestrial Radio Access Networks (E-UTRAN), a RAN is referred to as an evolved NodeB or eNodeB, while the mobile station or mobile terminal is referred to as User Equipment, UE. In LTE networks the access scheme for downlink communication, i.e. communication from the RAN to the UE, is Orthogonal Frequency Division Multiple Access (OFDMA), while the access scheme for uplink communication, i.e. communication from the UE to the RAN, is Single Carrier OFDMA (SC-OFDMA). UEs are time and frequency multiplexed on a physical uplink shared channel (PUSCH), which requires time and frequency synchronisation between an UE and the RAN.

A fundamental procedure in any cellular system is the random access procedure, which enables a mobile terminal or station to contact the network in an unsynchronised manner. In LTE wireless networks a non-synchronised uplink Random Access Channel (RACH) is used by the UE to send random access requests to the RAN. In response, the RAN sends back timing advance information to allow the UE to adjust its time alignment and thus to transmit successfully on the PUSCH. The random access procedure is used to request an initial access, to re-establish uplink (UL) synchronisation or as part of handover. As defined in 3GPP Technical Specification 36.300 the LTE random access procedure comes in two forms, allowing access to be either contention-based or contention-free. The contention-free random access procedure is used only to re-establish synchronisation prior to downlink data transmission and for incoming handover, when the UE contacts the RAN in the cell targeted for handover. The contention-based random access procedure may also be used for re-establishing synchronisation prior to downlink data transmission and for incoming handover, but it is also used for establishing initial access of the UE when it is in an idle state (i.e. the Radio Resource Control state: RRC-IDLE) and for re-establishing synchronisation prior to uplink data transmission. In both contention-based and contention-free random access procedures, the UE transmits a random access preamble to the RAN on the uplink RACH. In the contention-based random access procedure, the preamble is randomly chosen by the UE from a number of available preambles, with the result that more than one UE may transmit the same preamble simultaneously. Hence there is a need for signalling to resolve any contention. In the contention-free random access procedure, on the other hand, the RAN allocates a dedicated preamble to a UE, enabling contention-free access. This results in a faster procedure, which is particularly important for handover.

The UE initiates a contention-free random access (CFRA) procedure by transmitting the CFRA preamble. The RAN acknowledges receipt of the detected CFRA preamble by transmitting a random access response. This response includes a timing advance (TA) update to enable uplink synchronisation. The UE then adjusts the terminal transmit timing or time alignment using the TA update before transmitting a scheduled message on the uplink shared channel. This third message serves as an acknowledgment to the RAN that the random access response was received.

A problem may occur if the TA update information received by the UE is incorrect, as the UE will then not be able to synchronize with the network and not be able to transmit messages over the uplink shared channel (PUSCH) successfully. This may occur, for example, if the RAN fails to correctly detect the random access preamble sent by the UE, or rather, performs an estimate of transmission timing using different received preamble sequence yet assigns this to the UE so that an incorrect TA update is sent to the UE. This may occur in the case of very high speed UEs. Preambles are generated by cyclic shifts of a number of root sequences, which are configurable on a cell basis. At high velocity, frequency offset due to the Doppler shift causes spurious or aliased peaks. Sometimes a second peak or third peak of a given preamble sequence may shift into the detection window of an adjacent preamble and, depending on the power settings of the UE, with a signal strength that is greater than the detection threshold for the adjacent preambles. If the adjacent preamble is a contention-free random access preamble, the RAN may use the detected second or third peak to calculate time alignment then erroneously assign this TA to the adjacent preamble. Because these spurious peaks occur at known cyclic shift values, it is possible to reduce the risk of detecting an incorrect preamble by not using some cyclic shifts. The CFRA preamble set is then referred to as a restricted set. However even if UE is configured with such a restricted set, when the UE velocity is around 350 km/hour with a frequency offset in the range of around −1705 Hz to 1705 Hz, the third peak of an earlier preamble may have a sufficiently high signal strength to be detected in place of the real preamble. When the restricted set is not configured in the UE, frequency offsets greater than 625 Hz already allow both a second and a third peak of a preamble to become dominant in adjacent detection windows resulting in a higher risk of failure.

When the TA information used by the UE is incorrect, the subsequent uplink message sent to the RAN will fail. The RAN is expecting the uplink message, as this serves as an acknowledgment that the random access response and the information contained therein has been received. In the absence of this uplink message, or rather upon failure to detect this uplink message, the RAN thus sends a non acknowledgment to the UE by way of an automatic repeat request. The UE will then retransmit the message on the shared uplink channel (PUSCH). This process continues until the UE has retransmitted the message a maximum number of times, at which point no further non-acknowledgement messages are sent by the RAN. The UE takes no further action as it assumes that the CFRA procedure is successful after receipt of the random access response and may ultimately return to an idle mode. The delay caused by this failure is a particular problem when the CFRA procedure is used for handover as it may lead to call drops and negatively impact an operator's key performance indicators.

In the light of view of the problems associated with the prior art there is a need for an improved contention-free random access procedure.

SUMMARY

It is an object to obviate at least some of the above disadvantages and provide a more robust contention-free random access procedure and specifically, a contention-free random access procedure that is able to recover more quickly in case of failure.

This and other objects are achieved in accordance with a first aspect of the present disclosure in a radio access node in a wireless telecommunication network for performing a random access procedure with a user equipment UE. The radio access node comprises a transceiver element for transmitting information to, and receiving information from, UEs. The transceiver element is configured to receive a first message from a UE, the first message containing a pre-assigned contention-free random access preamble and representing a start of a random access procedure. The transceiver element is also configured to respond to the received first message by sending a second message to the UE, the second message containing time alignment information for enabling a scheduled transmission of a third message by the UE. The transceiver element is further configured to ascertain that no third message is received from the UE within a predetermined period of time and to subsequently transmit a command to the UE ordering a restart of the random access procedure with the same assigned contention-free random access preamble.

By virtue of this configuration, the RAN not only determines that the random access procedure has failed by ascertaining that no third message is received, but by ordering the restart of the random access procedure with the same contention-free random access preamble used in the first message, also secures the restart of the random access procedure within a defined timeframe, so ensuring that delays are minimised and the following random access procedure, whether handover or downlink data transmission, may be pursued successfully.

In accordance with a preferred embodiment of the disclosure, the transceiver element, which preferably includes transceiver circuitry and a control module coupled to, and configured to control the transceiver circuitry, is further configured to transmit the command ordering the restart of the random access procedure to the UE on a downlink control channel and to include the same assigned contention-free random access preamble in this command. By ordering the restart with a direct order that is conventionally used to assign a contention-free random access preamble and request uplink synchronisation, the UE may respond in the conventional manner by initiating a random access procedure, but using the same preamble. The UE thus does not require specific modification to use the improved random access procedure.

In a particularly advantageous embodiment of the disclosure, the predetermined period of time is selected to ensure that the UE does not return to an idle mode of operation. This greatly reduces any delays and means that handover, in particular, is far less likely to fail.

This predetermined time is preferably the time required for the transceiver element to transmit a request for a repeat transmission of a third message from the UE at least a predetermined number of times to the UE. In this way it is ensured that a transient error in a single transmission does not cause the restart of the random access procedure, yet still enables the delay to be kept to a minimum. The predetermined number of requests is preferably a predefined maximum number of requests stored in the radio access node. In LTE, such a request is a Hybrid Automatic Repeat Request (HARQ) and the maximum number configured for a UE may vary from one to around eight.

The consequences of a failed random access procedure are severe when uplink synchronisation is required for handover, so the transceiver element is preferably configured to ascertain that the random access procedure relates to a handover procedure in which the radio access node is a target node before transmitting the command to the UE ordering the restart of the random access procedure. However, other procedures also benefit from the considerably reduction in delay when the random access procedure is revived in this way.

The radio access node is preferably configured to operate in an LTE wireless network, however, radio access nodes operating in any wireless cellular network that requires a contention-free random access procedure for time-sensitive operations will benefit by this configuration.

The above objects are further achieved in accordance with a second aspect of the present disclosure in a method as defined in the appended claims, and, in accordance with a third aspect, in a computer program product for use in a radio access node of a wireless network as defined in the claims.

BRIEF DESCRIPTION OF THE DRAWINGS

Further objects and advantages of the present disclosure will become apparent from the following description of the embodiments that are given by way of example with reference to the accompanying drawings. In the figures:

FIG. 1 schematically illustrates a wireless access network,

FIG. 2 shows signalling for a contention-free random access procedure in accordance with prior art, FIG. 3 schematically illustrates the spread of a preamble relative to adjacent detection windows.

DETAILED DESCRIPTION

Figure 3:
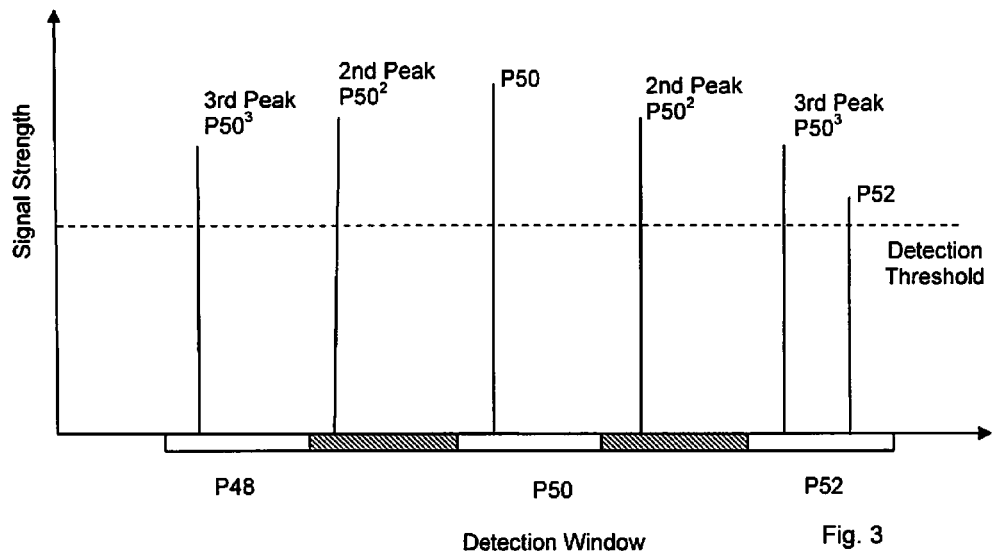

FIG. 1 shows elements of a cellular wireless access network relevant for the present disclosure. In the exemplary embodiment the wireless network is a Long Term Evolution (LTE) wireless network, or Evolved Universal Radio Access Network (E-UTRAN) as defined in 3GPP technical specification 36.300. However, a variety of wireless networks employ random access techniques and the disclosed embodiments are applicable to all such networks.

FIG. 1 illustrates two Radio Access Nodes (RAN) 10 and $10_1$, each defining its own cell or coverage area, 11 and $11_1$. Under the LTE specification the RANs are referred to as eNodeB's, however, these elements may also be referred to as base stations. In general the RAN hardware, when deployed, is fixed and stationary. Two User Equipments (UE) 20 and $20_1$ are also illustrated in FIG. 1. A UE may also be referred to as a terminal or mobile station and may be a fixed or mobile device, such as a mobile phone, smart phone, personal digital assistant, a wireless modem card, etc. For the purposes of illustration, the UEs illustrated in FIG. 1 are mobile devices. When synchronised with the network, each UE may communicate with its serving RAN over a synchronised uplink channel called the Physical Uplink Shared Channel (PUSCH). When a UE is not uplink synchronised with the network it uses a random access procedure to transmit requests to the RAN by sending a random access preamble on a Physical Random Access Channel (PRACH). LTE wireless networks may use two forms of random access procedures, contention-based random access (CBRA) or contention-free random access (CFRA). The present disclosure is directed towards providing an improved, which also may be described as a modified, and more robust CFRA procedure and thus only the CFRA process will be discussed here.

In LTE wireless networks, the CFRA procedure is used for downlink data arrival, positioning and handover. The signalling for the current CFRA procedure is illustrated in FIG. 2, which shows the signalling between a UE and a RAN. This procedure is described in 3GPP Technical Specification 36.300. Before any random access process may be initiated, the RAN first assigns a contention-free random access preamble (CFRA-P) to the UE via dedicated signalling in the downlink. This is shown at event 30 in FIG. 2. The CFRA-P is taken from a set used only for the CFRA procedure and is dedicated to the UE which ensures no contention. The CFRA-P is sent in two ways depending on the purpose of the random access procedure. This is illustrated in FIG. 1. When the purpose is the handover of UE 20 from a serving cell $11_1$ defined by serving RAN $10_1$ to target cell 11 defined by target RAN 10, the CFRA-P is sent from the RAN 10 in the target cell 11 to the source RAN $10_1$ via radio resource control (RRC) signalling (specifically using a RACH-Config Dedicated Information Element) and from the source RAN $10_1$ to UE 20. When the random access procedure is for downlink data arrival or positioning, as illustrated for UE $20_1$, it is the serving RAN 10 that sends the CFRA-P via a downlink control channel, specifically the Physical Downlink Control CHannel (PDCCH). This is considered as an order for uplink synchronisation to enable a subsequent downlink data transmission. Thus the CFRA-P is assigned to the UE 20 by the RAN 10 either directly or indirectly before any CFRA procedure may be initiated.

As shown in FIG. 2, the random access procedure is initiated by the UE, which sends the assigned CFRA-P on the uplink RACH to the RAN 10 at event 40. The RAN 10 uses the CRFA-P to estimate the transmission timing of the UE, and then responds to this first message with a second message MSG2, or random access response, at event 50. This response conveys a CFRA-P identifier and timing alignment information, or timing advance (TA) update, to enable the UE to adjust the timing of its uplink transmission or for receipt of data on the downlink channel. When the random access procedure is for handover, the random access response sent at event 50 also includes an initial uplink grant to be used by the UE 20 on the uplink shared channel (PUSCH). At event 60 in FIG. 2 the UE 20 transmits a scheduled third message (MSG3) on the uplink shared channel, including the received grant if this precedes handover. This third message (MSG3) serves the purpose of verifying to the RAN 10 that the UE 20 received the random access response at event 50. The RAN 10 acknowledges receipt of MSG3 using a Hybrid Automatic Repeat Request Acknowledgement (HARQ ACK).

When UEs operate at very high speed, the resulting high frequency offset may cause spurious peaks in preamble sequences sent in a CFRA message, such as that sent at event 40 in FIG. 2. This is illustrated in FIG. 3, which shows a graph schematically depicting signal strength plotted against detection window slots, which may represent frequency or time slots depending on the modulation technology used. Three detection windows are shown for preamble sequences P48, P50 and P52. These preambles form part of a restricted set selected to minimise false detection. Thus the detection windows of each preamble are not contiguous, but separated by guard bands. It is assumed that preamble P50 is assigned to and being used by a very high speed UE. The signal power for preamble P50 is shown in FIG. 3 and consists of a main peak P50, two second peaks $P50^2$ and two third peaks $P50^3$. Also shown is the signal strength for preamble P52, which occurs in the detection window for this preamble. As may be seen from this graph, the signal strength of the $3^{rd}$ peak of preamble P50, $P50^3$ is above the detection threshold and even exceeds the signal strength of preamble P52. If preamble P52 is a CFRA-P that is currently being used by a UE, the RAN may erroneously detect the $3^{rd}$ peak of P50 in the detection window for P52 in place of the real preamble P52 and use this wrongly detected preamble to estimate the transmission timing for that UE. This means that the timing alignment information (TA update) sent by the RAN 10 in the random access response MSG2 to UE 20 at event 50 in FIG. 2 will be wrong. If the restricted set of preambles is not implemented by a UE it is clear from FIG. 3 that the risk of such an erroneous detection is still greater as both the third and second peaks of a given preamble will land in detection windows of adjacent preambles.

If the TA update information sent to the UE 20 at event 50 in FIG. 2 is wrong, clearly the subsequent scheduled transmission sent by the UE 20 on the PUSCH will fail, as it will either not be received at all or fail to be decoded by the RAN 10. The RAN 10 will then send a HARQ non-acknowledgement (HARQ NACK) and, since repeat transmissions of MSG3 will also fail, repeat this HARQ transmission as many times as is configured for the UE. The random access procedure will thus end without the UE achieving synchronisation with the network and may only be restarted after the assignment of a new CFRA-P by the RAN 10 to the UE 20, resulting in significant delays. When the procedure is related to handover, these delays may lead to call drops, which impact negatively on an operator's key performance indicators.

In accordance with an improved CFRA procedure, these delays are significantly reduced and the contention-free random access procedure revived by the introduction of additional features in the RAN. This is described below with reference to the signalling diagram in FIG. 4 and flow chart of FIG. 5, which illustrates the steps performed by the RAN 10. The first four signals shown in FIG. 4 are identical to those shown in FIG. 2 and consequently, the same numbering has been applied to these events.

Figure 4:
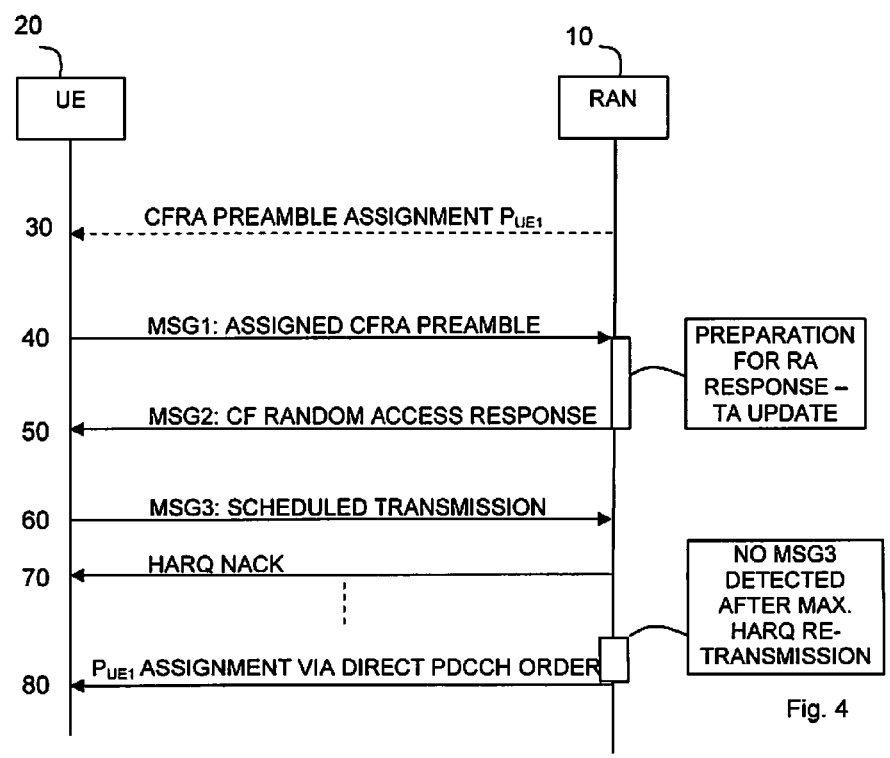
FIG. 4 shows signalling for an improved contention-free random access procedure.

FIG. 4 illustrates a signalling diagram according to the disclosure of this application. The random access procedure is preceded by the allocation by RAN 10 of a CFRA preamble (CFRA-P), denoted $P_{UE1}$ in this example, to the UE as shown at event 30 of FIG. 4. This is done either directly or indirectly via a source RAN when the purpose is handover. The random access procedure then starts when the UE 20 transmits the assigned CFRA-P, $P_{UE1}$, as MSG1, which is received by RAN 10 at event 40. It is the transmission of this message from the UE 20 to the RAN 10 that represents the start of the random access procedure. The RAN 10 acknowledges receipt by sending a random access response or second message, denoted MSG2, having first estimated the transmission timing based on the preamble, $P_{UE1}$, sent in MSG1 and includes timing advance information in MSG2. The UE 20 then responds by sending a third message (MSG3) as a scheduled transmission on the PUSCH at event 60. The RAN 10 listens out for this third message or scheduled transmission and, when it has determined or ascertained that none is detected, sends an automatic repeat request message, specifically a Hybrid Automatic Repeat Request Non-Acknowledgement (HARK NACK) at event 70. Assuming that the RAN's failure to detect this third message or scheduled transmission is due to the use of incorrect time alignment information sent in MSG2, a repeat transmission of MSG3 will also fail. The RAN 10 resends the automatic repeat request or HARK NACK until this has been sent a maximum number of times, which is configured for the UE in question. In LTE, the maximum number of Hybrid Automatic Repeat Requests (HARQ) configured for a UE may vary from one to around eight. After this time, the RAN 10 reassigns the same CFRA preamble, $P_{UE1}$, via a direct order to the UE on the Physical Downlink Control Channel (PDCCH) commanding the UE to perform uplink synchronisation at event 80. This is considered as a command to restart the random access procedure with the same preamble, as the UE 20 will respond by transmitting the random access preamble $P_{UE1}$ on the PRACH, which effectively amounts to resending MSG1, although the UE is actually responding to the direct order sent at event 80. The whole procedure is then repeated with the same random access preamble $P_{UE1}$. The likelihood of the preamble in this second MSG1 being wrongly detected is low, so the time alignment information transmitted in a second MSG2 by RAN 10 should enable the UE 20 to synchronise with the network, resulting in a successful detection of the scheduled transmission by the UE 20. It is noted that the UE 20 is configured to respond to a direct order for uplink synchronisation, so that this command does not alter the function of a conventional UE 20 in any way.

Figure 5:
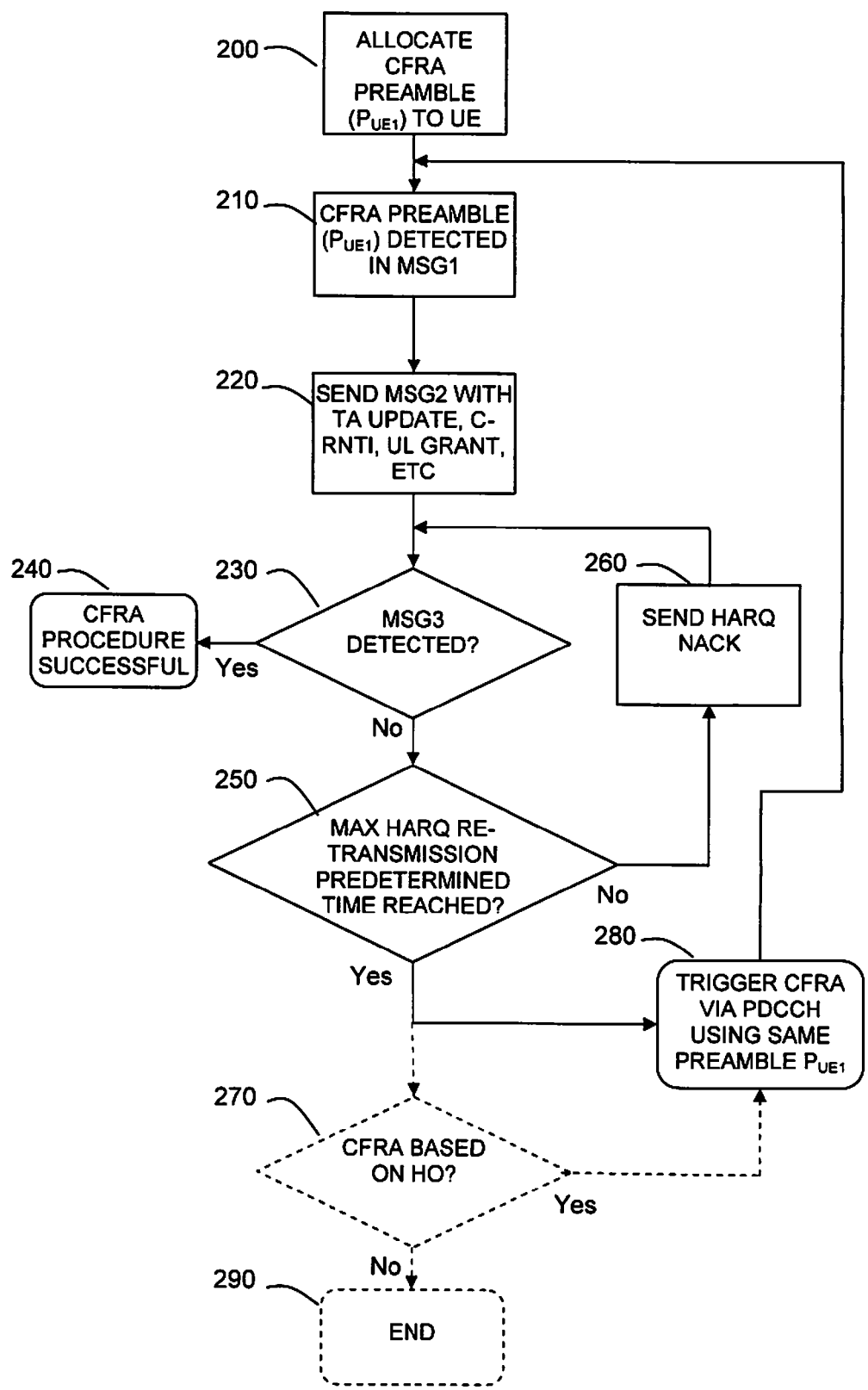
FIG. 5 is a flow chart illustrating an improved contention-free random access procedure and FIG. 6 schematically illustrates elements of a radio access node.

FIG. 5 illustrates the modified function of the RAN 10 in accordance with a preferred embodiment. However, before this function is described, reference will first be made to an exemplary structure of a RAN 10 as illustrated schematically in FIG. 6.

Figure 6:
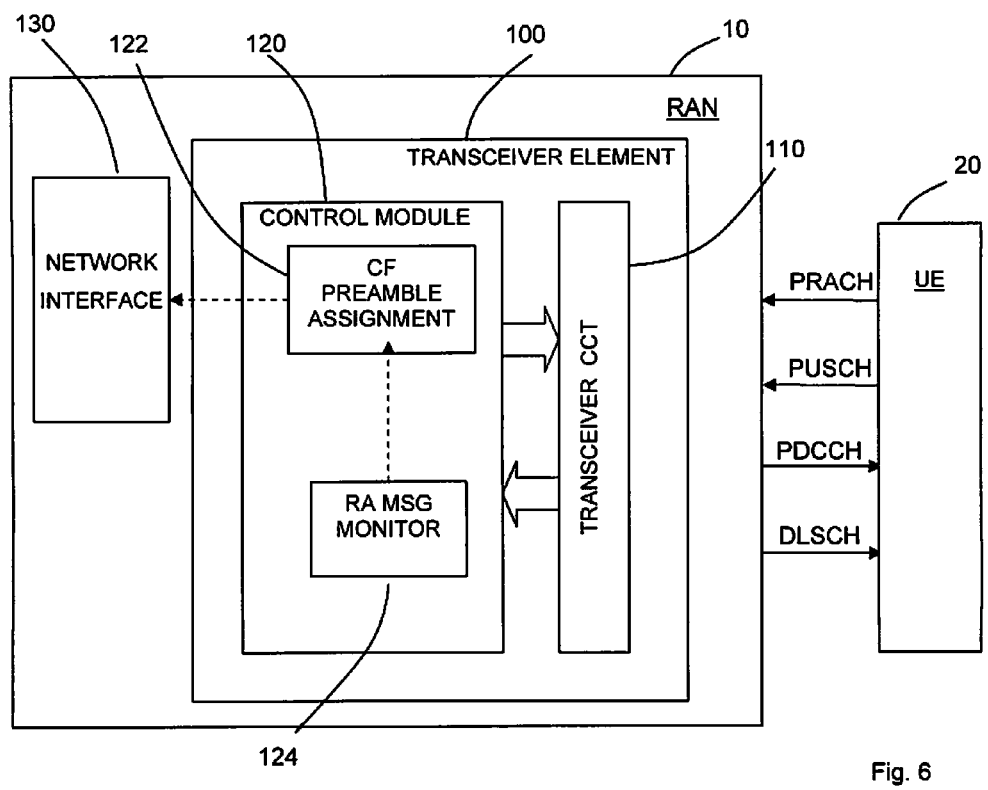

FIG. 6 shows a RAN 10 connected via a number of transport channels (a physical random access channel, PRACH, a physical uplink shared channel, PUSCH, a physical downlink control channel, PDCCH and a physical downlink shared channel, PDSCH) to a UE 20. Within the RAN 10 there is shown a transceiver element 100 that includes transceiver circuitry 110 arranged to transmit and receive information wirelessly to and from UEs over the illustrated transport channels, and a control module 120 that controls the operation of the transceiver circuitry 110. The control module 120 typically comprises one or more processing units with associated working memory and memory containing a number of applications or software modules, two of which are illustrated at 122, 124. Also shown is a network interface 130 intended to represent the circuitry and functions associated with communication with the network and specifically with other RANs in the network. Within the control module 120 two modules are illustrated. A first module, CF Preamble Assignment, 122 has the function of assigning a CFRA preamble to a UE. This function is conventionally used when a UE requires uplink synchronisation for handover, downlink data transmission or positioning. In this case, the CFRA preamble is assigned either by sending a direct order to the UE 20 via the physical downlink control channel PDCCH, or when the RAN 10 is in a target cell for handover of the UE, by sending the preamble to the RAN in the source cell via Radio Resource Control RRC signalling. This latter function is represented schematically by the dashed arrow between CF Preamble Assignment module 122 and the network interface 130. The second module, RA MSG Monitor, 124 has the function of monitoring the messages received from the UE 20 as part of the random access procedure.

The function of this modified RAN will now be described with reference to FIGS. 5 and 6. At step 200 illustrated in FIG. 5, the RAN 10, and specifically the transceiver element 100 allocates a CFRA preamble ($P_{UE1}$) using the CF Preamble Assignment module 122 and transceiver circuitry 110 to a UE 20. As described previously and illustrated in FIG. 1, this may be done by sending a direct order on the Physical Downlink Control Channel (PDCCH). Alternatively, when uplink synchronisation is required for handover and the RAN 10 is the target RAN, the RAN 10 sends the CFRA preamble to the RAN 10₁ located in the UE's serving cell using the CF Preamble Assignment module 122 and the network interface 130. The serving RAN then sends the preamble to the UE 20.

At step 210 illustrated in FIG. 5 the transceiver element 100 of RAN 10 detects the CFRA preamble using the RA MSG Monitor module 124. This is part of MSG1 sent at event 40 in FIG. 4. The RAN 10 then estimates the transmit timing for the UE based on the detected preamble to calculate a timing advance (TA) update and, using the transceiver element 100, sends a message MSG2 to the UE at step 220. This message contains a range of information, including the timing advance (TA) update, identification in the form of the C-RNTI and, if the procedure concerns handover, an initial uplink grant to enable the UE to use the physical uplink shared channel. The RAN 10 then awaits receipt of a scheduled transmission (i.e. MSG3) on the PUSCH using the RA MSG Monitor module 124. If this third message is detected at step 230, this serves as an acknowledgement of the information sent at step 220 and thus, after acknowledgement by the RAN 10 by way of a HARK ACK acknowledgement, effectively terminates the CFRA procedure successfully at step 240. However, if the transceiver element 100 fails to detect a scheduled transmission (MSG3) at step 230, the process moves to step 250 where it is determined whether a maximum number of automatic repeat requests have been sent, or more specifically whether a maximum number of Hybrid Automatic Repeat Request Non-Acknowledgements (HARQ NACK) have been sent. If the maximum number has not been reached, the RAN 10 sends a HARQ NACK at step 260. The procedure then returns to step 230 where the transceiver element 100 again listens out for a scheduled transmission that is the third message (MSG3) from the UE using the RA MSG Monitor module 124. Assuming no scheduled transmissions are detected or received, this loop continues until the maximum number of HARQ requests have been sent whereupon the transceiver element 100 determines or ascertains with the RA MSG Monitor module 124 that no third message has been received and the procedure moves to step 270. The time required to arrive at this decision is determined by the sending of a maximum configured number of HARQ NACK messages and waiting for the retransmitted message in reply, which preferably results in a predetermined time.

In step 270 illustrated in FIG. 5 the RAN 10 checks whether the CFRA procedure relates to handover. This information is available in the RAN 10 or accessible by the RAN 10 as the initial assignment of the CFRA preamble by the RAN is performed in response to a known situation, e.g. data for downlink transmission or handover. If the reply is in the affirmative, the procedure moves to step 280 where a restart or repeat of the contention-free random access (CFRA) procedure is accomplished by the RA MSG Monitor module 124 signalling the CF Preamble Assignment module 122, as illustrated by the dashed arrow between these two modules, to trigger the generation of a direct order to the UE to initiate a random access procedure via the PDCCH, but using the same CFRA preamble $P_{UE1}$. However, if at step 270 it is ascertained that the random access procedure is not for handover, the method moves to step 290 with the termination of the procedure. As in the conventional procedure, no further action is taken and the UE may ultimately return to idle mode. It should be noted that step 270, at which the RAN 10 determines whether the random access procedure relates to handover, is an optional step as indicated by the dashed line.

If step 270 illustrated in FIG. 5 is not performed, i.e. if all failed contention-free random access procedures are to benefit from the improvement provided by the inventive mechanism, the method moves directly to step 280 with the transmission by the transceiver element 100 of a direct order for uplink synchronisation on the PDCCH giving the same preamble. The advantages of this process are significant when the random access procedure is for handover, however, delays are also minimised when the random access procedure is for uplink synchronisation prior to a downlink data transmission.

By forcing or triggering a restart of the CFRA procedure, i.e. the random access procedure that is initiated by the UE 20 sending the CFRA preamble in MSG1, the random access procedure is revived with minimum delay. In fact, the only delay associated with this procedure is a predetermined time defined by the time required to transmit a maximum configured number of HARQ NACK messages and receive the retransmitted message in reply. This ensures that the UE 20 will not return to idle mode or disconnect from the network so that handover may be completed successfully.

A further advantage of the improved CFRA procedure according to the present disclosure is that only the RAN requires modification.

It will be understood that a RAN, whether a base station, NodeB, eNodeB or other radio access node suitable for use in a cellular wireless telecommunication network will have a range of other components that are well known to one of ordinary skill in the art and are thus neither illustrated nor described here. In addition, the illustrated schematic is not intended to limit the possible configuration of the various elements making up the RAN, but is merely intended to illustrate the functional arrangement of a RAN. In practice these functions may be implemented using any suitable software or hardware configurations. For example there may be a real or functional separation of both software and hardware resources for handling uplink and downlink traffic.

The embodiments described above are to be understood as a few illustrative examples of the present disclosure. It will be understood by those skilled in the art that various modifications, combinations, and changes may be made to the embodiments without departing from the scope of the present disclosure. In particular, different part solutions in the different embodiments may be combined in other configurations, where technically possible. The scope of the present disclosure is, however, defined by the appended claims.

The invention claimed is:

1. A radio access node in a wireless telecommunication network for performing a random access procedure with a User Equipment, UE, said radio access node comprising
 a transceiver element for transmitting information to and receiving information from UEs,
 wherein said transceiver element is configured to receive a first message from a UE, said first message containing a pre-assigned contention-free random access preamble and representing a start of a random access procedure and to respond to said received first message by sending a second message to said UE, the second message containing time alignment information for enabling a scheduled transmission of a third message by said UE to said radio access node,
 wherein said transceiver element is further configured to:
  ascertain that no third message is received from said UE within a predetermined period of time;
  transmit a request to said UE at least a predetermined number of times, wherein said request requests a repeat transmission of the third message from said UE and the predetermined number of times comprises a predefined maximum number of requests stored in said radio access node; and
  transmit a command to said UE ordering a restart of said random access procedure with the same assigned contention-free random access preamble after transmitting the request to said UE the predetermined number of times.

2. A radio access node according to claim 1, wherein said transceiver element includes transceiver circuitry and a control module coupled to, and configured to control, said transceiver circuitry.

3. A radio access node according to claim 1, wherein said transceiver element is further configured to transmit said command ordering the restart of said random access procedure to said UE on a downlink control channel, and to include the same assigned contention-free random access preamble in said command.

4. A radio access node according to claim 1, wherein said predetermined period of time is selected to ensure that said UE does not return to an idle mode of operation.

5. A radio access node according to claim 1, wherein said transceiver element is further configured to ascertain that said random access procedure relates to a handover procedure in which said radio access node is a target node before transmitting the command to said UE ordering the restart of said random access procedure.

6. A radio access node according to claim 1, wherein said radio access node is further configured to pre-assign said contention-free random access preamble to said UE prior to the start of said random access procedure.

7. A radio access node according to claim 1, wherein said radio access node is configured to operate in an LTE wireless network.

8. A method of performing a random access procedure in a radio access node that is arranged in a wireless network and configured to communicate with User Equipment, UE, said method comprising:
 receiving, a first random access message from a UE, said first message containing a pre-assigned contention-free random access preamble and representing a start of a random access procedure
 responding to the received first message by sending a second message to said UE, said second message containing time alignment information for enabling a scheduled transmission of a third message by said UE to said radio access node,
 ascertaining that no third message is received from said UE within a predetermined period of time and
 transmitting a command to said UE ordering a restart of said random access procedure with the same pre-assigned contention-free random access preamble after transmitting a request to said UE a predetermined number of times, each said request requesting a repeat transmission of the third message, wherein the predetermined number of times comprises a predefined maximum number of requests stored in said radio access node.

9. A method according to claim 8, wherein said step of transmitting said command ordering a restart of said random access procedure includes transmitting a direct order to said UE on a downlink control channel, said direct order containing said assigned contention-free random access preamble.

10. A method according to claim 8, wherein said predetermined time is selected to ensure that said UE will not return to an idle mode of operation.

11. A method according to claim 8, further including: ascertaining that said random access procedure concerns a handover procedure in which said radio access node is the target node before transmitting said command ordering the restart of said random access procedure to said UE.

12. A method according to claim 8, further including: pre-assigning and transmitting said contention-free random access preamble to said UE prior to the start of said random access procedure.

13. A computer program product for use in a radio access node of a wireless network, said computer program product comprising instructions stored on non-transient computer-readable media which, when executed by a processor, perform the method of claim 8.

\* \* \* \* \*